UNITED STATES PATENT OFFICE.

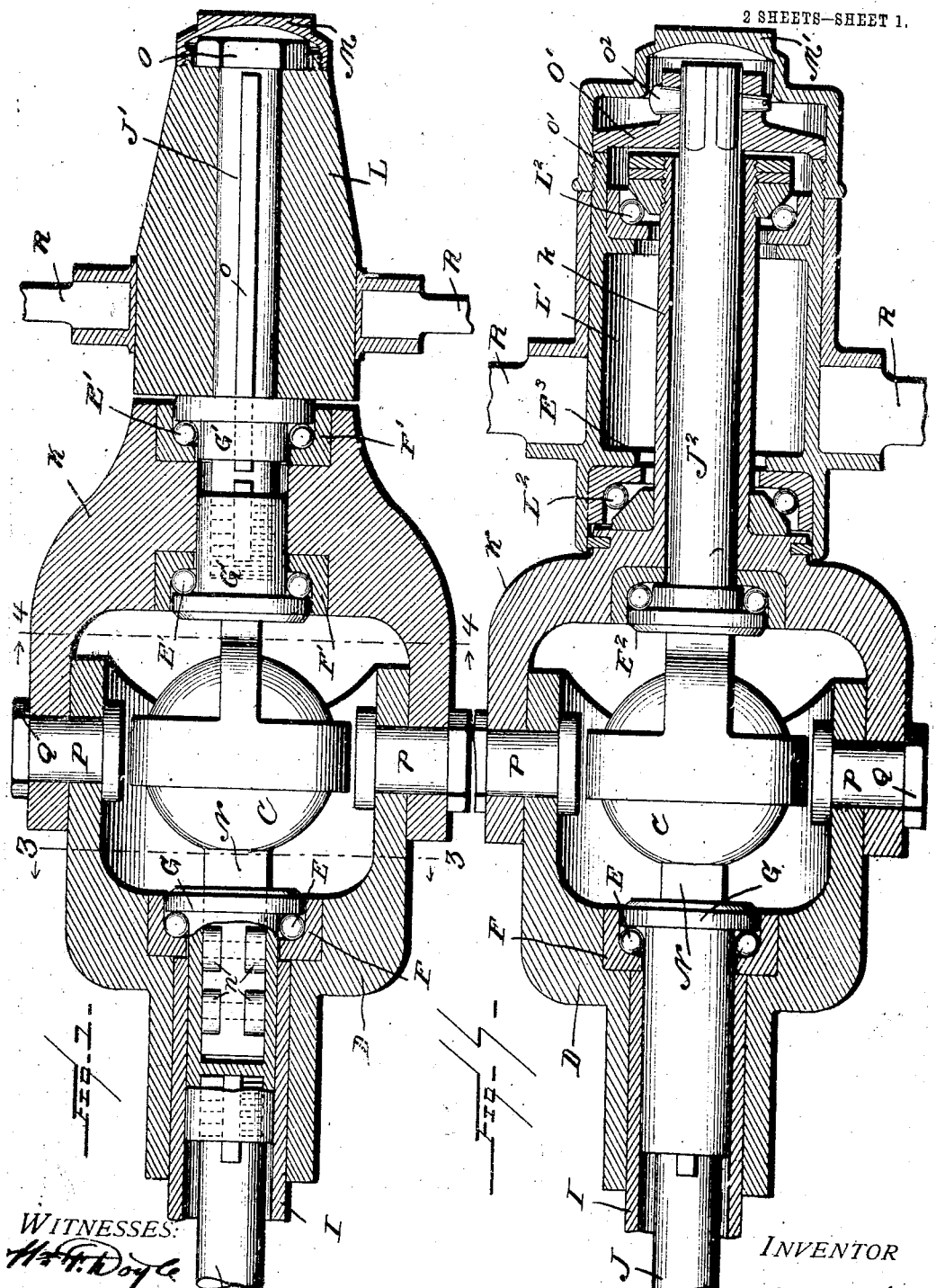

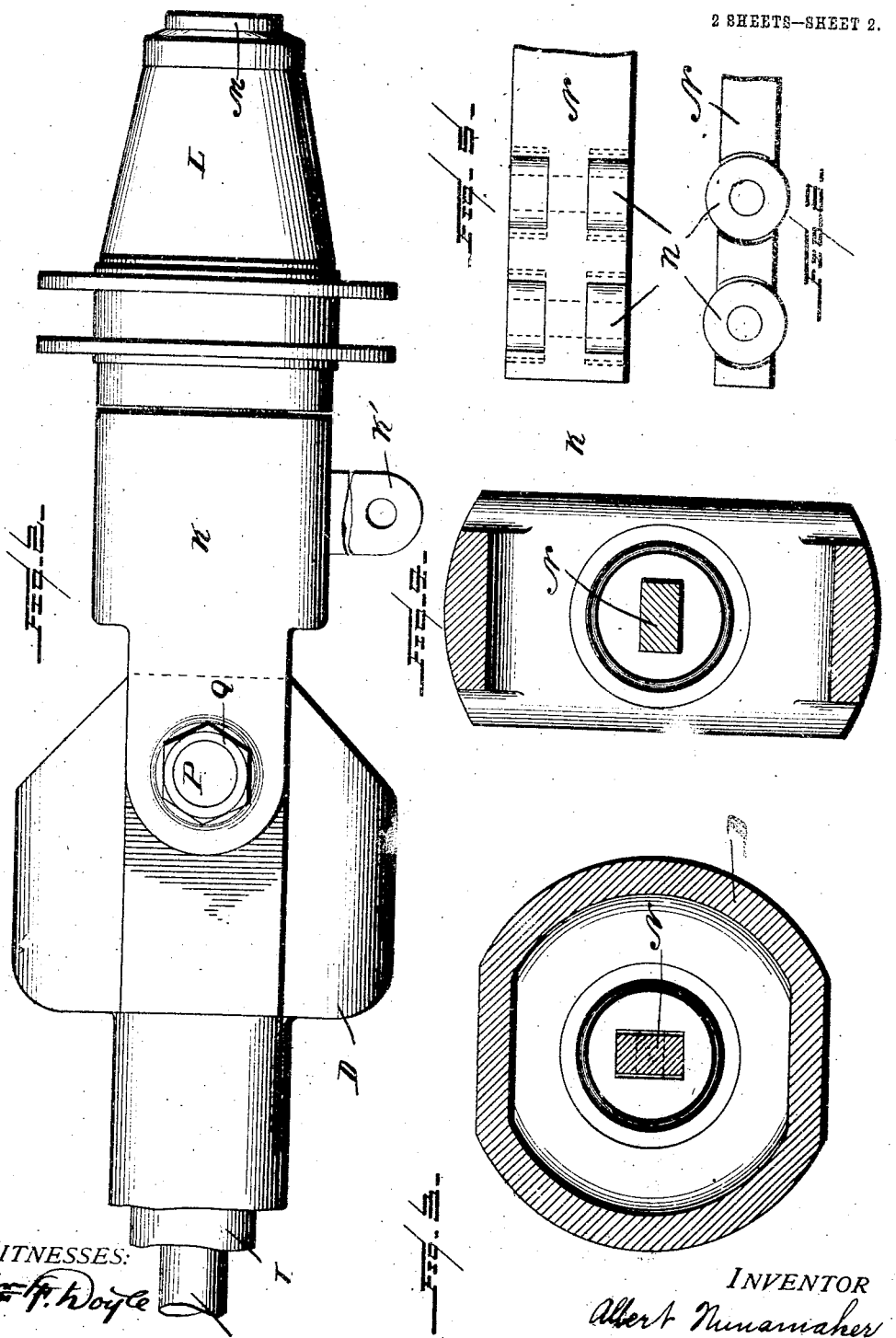

ALBERT NUNAMAKER, OF CLEVELAND, OHIO.

MOTOR-VEHICLE.

No. 809,525.  Specification of Letters Patent.  Patented Jan. 9, 1906.

Application filed April 26, 1905. Serial No. 257,434.

*To all whom it may concern:*

Be it known that I, ALBERT NUNAMAKER, a citizen of the United States, residing at Cleveland, in the county of Cuyahoga and State of Ohio, have invented new and useful Improvements in Motor-Vehicles, of which the following is a specification.

This invention relates to motor-vehicles, and particularly to that class in which the front or steering wheels are connected to the driving mechanism, so that four-wheel traction is permitted, making all the wheels driving-wheels.

The invention resides in the particular construction of the connections between the wheel and the driving-axle at the steering joint or knuckle.

An embodiment of the invention is shown in the accompanying drawings, in which—

Figure 1 is a central vertical section. Fig. 2 is a top plan view of the knuckle-joint. Fig. 3 is a section on the line 3 3 of Fig. 1. Fig. 4 is a section on the line 4 4 of Fig. 1. Figs. 5 and 6 are details of a roller bearing sliding connection between the universal joint and the driving-axle. Fig. 7 is a longitudinal section of a modification.

Referring specifically to the drawings, C indicates a universal joint of known construction connecting the driving-axle J with the spindle J' of the wheel. The wheel-hub is indicated at L, and it is fast upon the spindle—that is, the hub turns with the spindle.

R indicates spokes.

The axle tube or casing I has mounted rigidly thereon the inner steering-yoke D, the arms of which are connected to the arms of pins P, provided with nuts Q. This forms a the outer steering-yoke K by means of pivot-knuckle-joint, between the shaft-casing and yoke D and the yoke K, permitting the latter to turn to steer the vehicle. The yoke K has an arm K', to which the steering-gear is connected.

Upon the outer end of the shaft-section J is sleeved and fixed a ring-cone G, opposite which is a ring-cup F, seated in the yoke D, the cup and cone forming a raceway for the balls E, the whole forming bearings upon which the outer end of the axle J turns.

The inner end of the axle-spindle J' projects as a stub through the outer steering-yoke K and is supported by ball-bearings E' between cones G' on the stub of the spindle and ring-cups F', let into the outer yoke K. These parts form the bearings and supports for the wheel, which, as said, rotates with the spindle J'.

The universal joint C has two projecting necks N, arranged at right angles to each other, and the ends of the axle J and spindle J' are slotted lengthwise to receive the outer ends of these necks, the necks being squared so that the motion is transmitted from the axle J through the universal joint to the spindle J'. The universal joint is set on a center with the pivots P, and to accommodate the end play, which is bound to occur to a greater or less extent in consequence of vibration or looseness of the parts, the inner neck N is provided with a plurality of rollers $n$, set upon pins in recesses in the upper and lower edges of the necks and arranged to bear against the opposite walls of the longitudinal slot in the end of the axle J. This allows an end play without friction and prevents any distortion or undue wear on the universal joint.

The hub L and outer cup G' are preferably splined onto the spindle J', as indicated at $o$, and the outer end of the axle is provided with an adjusting-nut O, by which wear at the bearings E' can be taken up by sliding the hub and bearing-cone inwardly to the necessary extent. The ring G' backs against the hub. The adjusting-nut is covered by the hub-cap M.

In the modification shown in Fig. 7 a different manner of mounting the wheel and its spindle is shown. Referring particularly to this, the outer yoke member K is continued as a sleeve $k$ over the axle-spindle $J^2$, which rotates in the sleeve upon bearings $E^2$ at the inner end thereof. The wheel-hub L' is mounted upon bearings $L^2$ on the outside of the sleeve $k$ and is clutched to and driven with the spindle by means of a clutch-piece O', which consists of an annular member fitted upon the squared end of the spindle $J^2$ and held thereon by a cotter $o^2$ and having a notched rim at $o'$, which engages corresponding notches in the outer rim or edge of the hub L'. A cap M' is screwed onto the hub and covers the end of the spindle. The bearings $L^2$ are formed by cones on the sleeve $k$ and cups which abut against ribs $E^3$ on the inside of the hub, with balls between the cups and cones. The outer cone is threaded onto the sleeve to adjust the bearings.

What I claim as new, and desire to secure by Letters Patent, is—

1. The combination, in a mechanism of the class stated, of an axle and a wheel-spindle having non-circular recesses in their ends, and a universal joint between the same having connecting-necks fitting in said recesses and having longitudinal movement therein.

2. The combination, in a mechanism of the class stated, of an axle and a wheel-spindle having non-circular recesses in their ends, and a universal joint having connecting-necks fitting in said recesses and having lengthwise movement therein, and rollers between said necks and the walls of the recesses.

3. In a mechanism of the kind described, in combination, an axle, a wheel-spindle having a universal joint therewith, a casing over the axle, a yoke pivotally connected to the casing and having a sleeve over the spindle, bearings between the spindle and the sleeve, bearing-rings at both the inner and outer ends of the sleeve, upon the outside thereof, the ring at the outer end being screwed on the sleeve for adjustment, and a wheel-hub mounted upon said bearings and connected to the spindle.

4. The combination with a motor-vehicle axle-casing having at the outer end a pivoted steering member, of a spindle, a wheel mounted thereon to turn therewith, bearing rings and rollers between the spindle and said members, one of which rings backs against the inner end of the wheel-hub, and an adjusting-nut screwed on the end of the spindle against the outer end of the hub.

In testimony whereof I have signed my name to this specification in the presence of two subscribing witnesses.

BERT NUNAMAKER.

Witnesses:
   JOHN A. BOUNNHARDT,
   LOTTIE NEWBURN.